(12) United States Patent
Lin

(10) Patent No.: US 12,342,062 B2
(45) Date of Patent: Jun. 24, 2025

(54) CAMERA LENS PROTECTOR ASSEMBLY OF MOBILE PHONE AND MANUFACTURING METHOD THEREOF

(71) Applicant: Zemin Lin, Shenzhen (CN)

(72) Inventor: Zemin Lin, Shenzhen (CN)

( * ) Notice: Subject to any disclaimer, the term of this patent is extended or adjusted under 35 U.S.C. 154(b) by 249 days.

(21) Appl. No.: 18/205,569

(22) Filed: Jun. 5, 2023

(65) Prior Publication Data

US 2024/0406530 A1    Dec. 5, 2024

(51) Int. Cl.
*H04N 23/55*    (2023.01)
*H04M 1/02*    (2006.01)

(52) U.S. Cl.
CPC .......... *H04N 23/55* (2023.01); *H04M 1/0264* (2013.01)

(58) Field of Classification Search
CPC ............................ H04M 1/0264; G03B 11/041
See application file for complete search history.

(56) References Cited

U.S. PATENT DOCUMENTS 11,032,458 B2 *  6/2021  Lin ..................... H04N 23/57
12,164,212 B2 * 12/2024  Navoa ................. G03B 11/041

FOREIGN PATENT DOCUMENTS

CN    211570524 U  *  9/2020
CN    214959638 U  * 11/2021

\* cited by examiner

*Primary Examiner* — Leon W Rhodes, Jr.
(74) *Attorney, Agent, or Firm* — Ying-Ting Chen

(57) ABSTRACT

A camera lens protector assembly of mobile phone includes multiple eye members and a protector cover which is manufactured by a method including a sandblasting step, a hole forming step, an oxidizing step and a cutting step form a starting material of an integral cover sheet. The protector cover has multiple through holes for mounting one or more eye members, so as to protect the camera lenses of the mobile phone, and the protector cover comprises an outer surface which has a surface profile formed from a processing surface of the integral cover sheet.

20 Claims, 8 Drawing Sheets

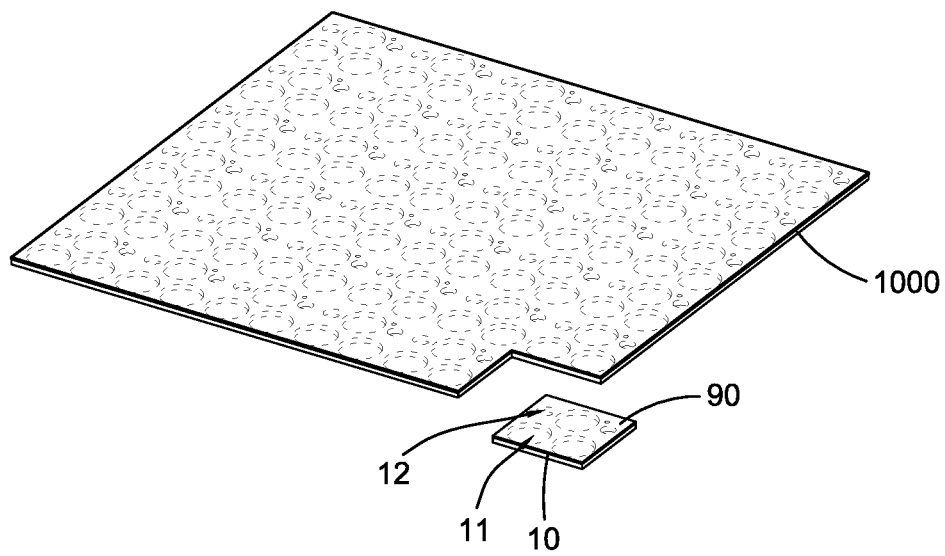

FIG.10

(a) sandblasting a processing surface 10001 of an integral cover sheet 1000 by a sandblasting material (b) forming a plurality of through holes 11 in the integral cover sheet 1000 with a blasted processing surface (c) oxidizing the processing surface 1001 of the integral cover sheet 1000 with the plurality of through holes 11

(d) cutting the integral cover sheet 1000 to provide a plurality of the protector covers 10 , wherein the protector cover 10 has one or more the through holes 11, wherein one or more eye members 20 are respectively mounted into the one or more through holes 11 to protect the one or more camera lenses 302 of the mobile phone 300, wherein the protector cover 10 comprises an outer surface 102 which is formed from the processing surface 1001 of the integral cover sheet 1000

FIG.11

CAMERA LENS PROTECTOR ASSEMBLY OF MOBILE PHONE AND MANUFACTURING METHOD THEREOF

BACKGROUND OF THE PRESENT INVENTION

Field of Invention

The present invention relates to a camera lens protecting accessory, and more particularly to a camera lens protector assembly of mobile phone and manufacturing method thereof.

Description of Related Arts

Currently, an electronic device such as a mobile phone and a tablet computer may be provided with a plurality of cameras which are protruded from a back surface of a main body of the electronic device. As a typical example, the mobile phone may be provided with a rear camera array which comprises a telephoto camera, a wide-angle camera, and an ultrawide-angle camera. When these cameras are exposed to outside, they are easy to be damaged or scratched.

A conventional camera lens protecting device, which has been developed in the market for covering the camera array to protect the camera array, generally includes a protecting cover and a transparent protecting sheet adhered on the protecting cover which has a plurality of holes aligned with the cameras. The protecting cover is generally made of a metal or a metal alloy, and the outer surface of the protecting cover is processed by a wire drawing treatment procedure in which the wire is pulled through a series of dies to form a wiring pattern on the outer surface of the protecting cover.

However, the wiring pattern may not be suitable for well matching with the back surface of the mobile phone. In addition, the wire drawing treatment procedure is not able to provide multiple desired colors of the outer surface of the protecting cover for a user to choose. In addition, there is risk that the protecting sheet which is adhered on the protecting cover may be scratched and slip off from the protecting cover.

SUMMARY OF THE PRESENT INVENTION

The invention is advantageous in that it provides a camera lens protector assembly of mobile phone and manufacturing method thereof, wherein an outer surface of a protector cover of the camera lens assembly is treated by an abrasive blasting method so as to obtain a visually clean surface and a satisfactory surface profile of the protector cover.

Another advantage of the present invention is to provide a camera lens protector assembly of mobile phone and manufacturing method thereof, wherein the surface profile of the outer surface of the protector cover is well matched with the texture of a rear surface of the mobile phone, so that when the camera lens protector assembly is mounted on the camera assembly of the mobile phone, the aesthetic appearance of the entire device is enhanced.

Another advantage of the present invention is to provide a camera lens protector assembly of mobile phone and manufacturing method thereof, wherein the protector cover is suitable for mass production from an integral large piece of cover material sheet.

Another advantage of the present invention is to provide a camera lens protector assembly of mobile phone and manufacturing method thereof, wherein the outer surface of the protector cover can be formed with a desired color after an electrolytic coloring step.

Another advantage of the present invention is to provide a camera lens protector assembly of mobile phone and manufacturing method thereof, wherein the camera lens protector assembly comprises a plurality of eye members provided at through holes of the protector cover and aligned with the plurality of cameras of the mobile phone, so as to protect the camera lenses while not having influence on their optical photographing functions.

Another advantage of the present invention is to provide a camera lens protector assembly of mobile phone and manufacturing method thereof, wherein the eye members are assembled at a rear side of the protector cover, so that the eye members are not protruded from the surface of the protector cover so as to prevent the eye members from being damaged and scratched.

Another advantage of the present invention is to provide a camera lens protector assembly of mobile phone and manufacturing method thereof, wherein the eye members and the camera lenses of the mobile phone are fitted into the through holes of the protector cover, so as to reduce the distance between the camera lenses and the light permeable films of the eye members, so that the field of view of each camera lens will not be adversely influenced.

Additional advantages and features of the invention will become apparent from the description which follows, and may be realized by means of the instrumentalities and combinations particularly pointing out in the appended claims.

According to the present invention, the foregoing and other objects and advantages are attained by a camera lens protector assembly of mobile phone comprising one or more camera lenses, wherein the camera lens assembly comprises one or more eye members and a protector cover, wherein the protector cover is manufactured by a method comprising the following steps.

(a) sandblast a processing surface of an integral cover sheet by a sandblasting material;

(b) form a plurality of through holes in the integral cover sheet with a blasted processing surface;

Oxidize the processing surface of the integral cover sheet with the plurality of through holes; and Cut the integral cover sheet to provide a plurality of the protector covers, wherein the protector cover has one or more the through holes, wherein the one or more eye members are respectively mounted into the one or more through holes to protect the one or more camera lenses of the mobile phone, wherein the protector cover comprises an outer surface which is formed from the processing surface of the integral cover sheet.

The present invention further provides a protector cover of a camera lens protector assembly of mobile phone comprising one or more camera lenses, wherein the protector cover is manufactured by a method comprising the following steps:

(a) Sandblast a processing surface of an integral cover sheet by a sandblasting material;

(b) Form a plurality of through holes in the integral cover sheet with a blasted processing surface;

(c) Oxidize the processing surface of the integral cover sheet with the plurality of through holes; and (d) Cut the integral cover sheet to provide a plurality of the protector covers, wherein the protector cover has one or more the through holes which are adapted for aligning with the one or more camera lenses, wherein the protector cover comprises an outer surface which is formed from the processing surface of the integral cover sheet.

The present invention further provides a protector cover of a camera lens protector assembly of mobile phone comprising one or more camera lenses, wherein the protector cover has one or more the through holes which are adapted for aligning with the one or more camera lenses, wherein the protector cover comprises an outer surface which is a blasted surface which is sandblasted by a sandblasting material and also is an anodized surface.

The present invention further provides a processing system for treating an outer surface of a protector cover, wherein the processing system comprises a sandblasting machine for blasting a processing surface of an integral cover sheet, a drilling machine for forming holes in the integral cover sheet, an oxidizing container for oxidizing the processing surface of the integral cover sheet, an optional electrolytic coloring device for coloring the processing surface of the integral cover sheet, and a cutting tool for cutting the integral cover sheet into pieces to obtain a plurality of the protector covers.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 10 is a perspective view illustrating the integral cover sheet for the camera lens protector assembly is cut for providing the protector cover according to the alternative mode the above preferred embodiment of the present invention.

FIG. 11 is a flow chart illustrating a processing method of the integral cover sheet for providing the protector cover according to the alternative mode the above preferred embodiment of the present invention.

DETAILED DESCRIPTION OF THE PREFERRED EMBODIMENT

Figure 1:
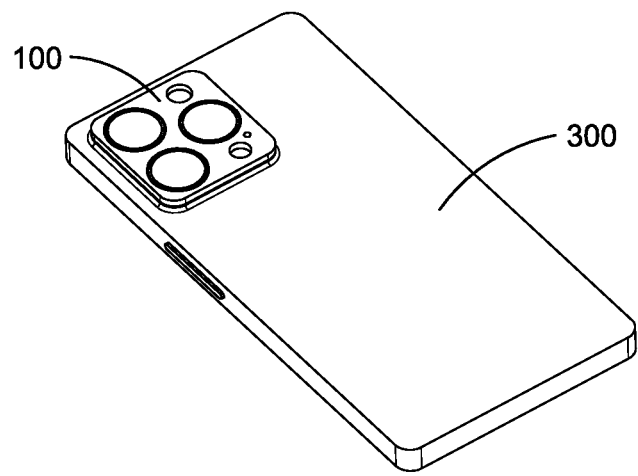
FIG. 1 is a perspective view illustrating a camera lens protector assembly assembled on a mobile phone according to a preferred embodiment of the present invention.
Figure 2:
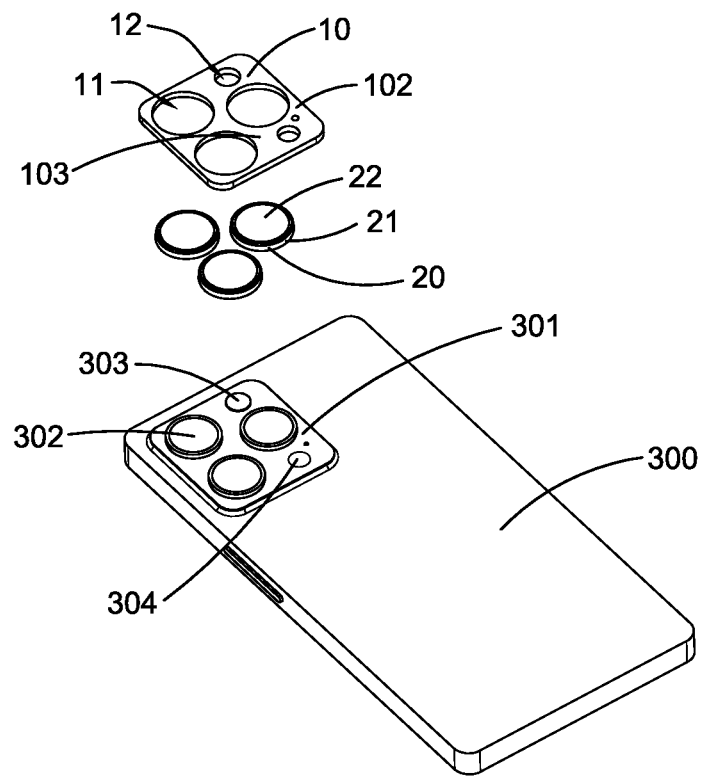
FIG. 2 is an exploded view illustrating the camera lens protector assembly according to the above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 to FIG. 7 of the drawings, a camera lens protector assembly 100 of a mobile phone 200 according to a preferred embodiment of the present invention is illustrated, the camera lens protector assembly 100 comprises a protector cover 10 having one or more through holes 11, and one or more eye members 20 mounted at the through holes 11 for protecting a plurality of camera lenses 302 of a camera assembly 301 of the mobile phone 300.

The protector cover 10 has an inner surface 101 that is adapted for facing toward the camera assembly 301 of the mobile phone 300 and an outer surface 102 which is opposite to the inner surface 101. The through holes 11 are penetrating through a thickness of the protector cover 10 and is extending from the inner surface 101 to the outer surface 102 for accommodating the eye members 20 and the camera lenses 302 of the camera assembly 301 of the mobile phone 300.

According to this preferred embodiment, the camera assembly 301 of the mobile phone 300 is embodied to comprise three cameras which are a wide-angle camera, a telephoto camera and an ultrawide-angle camera. The protector cover 10 has three through holes 11 which are aligned with the three cameras. The camera assembly 301 of the mobile phone 300 may further comprise a flash 303 for providing a flashing lighting, and a 3D sensor assembly 304 which may comprise a light projector and a depth camera for obtaining depth information. The protector cover 10 further has a plurality of penetrating holes 12, such as two penetrating holes 12 which are aligned with the flash 303 and the 3D scanner 304 of the camera assembly 301 of the mobile phone 300.

The person of ordinary skilled in the art should understand that the above three types of camera are examples only. The cameras can be other types of cameras such as ranger finder cameras, depth cameras, infrared cameras, fish-eye cameras, mirror cameras. and micro-lens cameras.

In this preferred embodiment, the outer surface 102 of the protector cover 10 is treated by an abrasive blasting method so as to obtain a visually clean surface and a satisfactory surface profile 103 of the protector cover 10, the abrasive blasting method is unlike the wire drawing process for treating the outer surface of the conventional lens protecting device.

Figure 3:
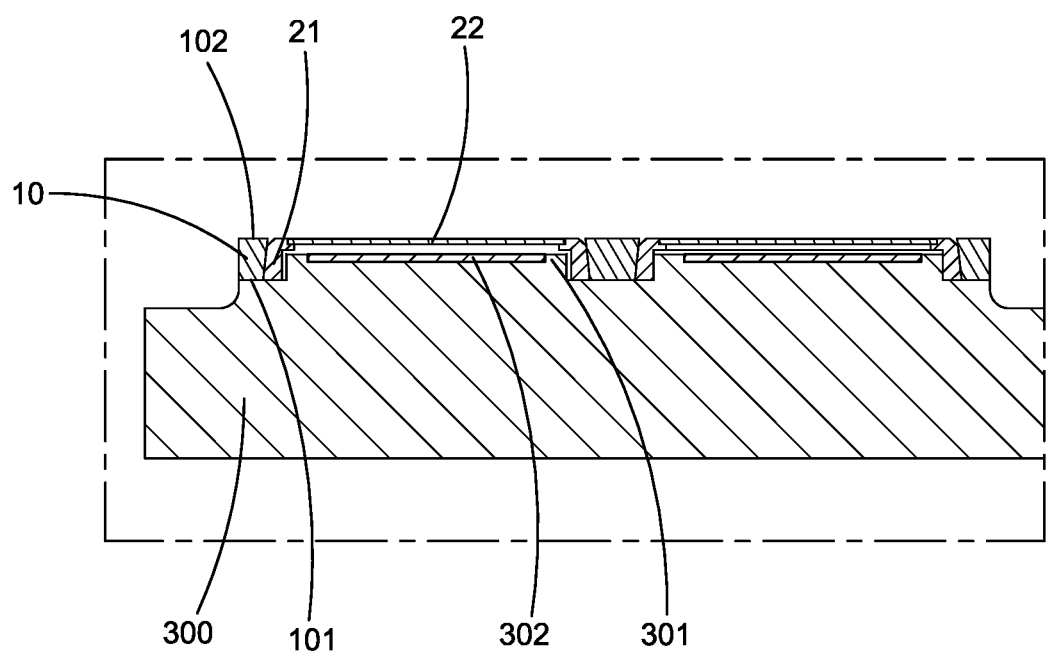
FIG. 3 is a sectional view illustrating the camera lens protector assembly according to the above preferred embodiment of the present invention.

As shown in FIG. 3 of the drawings, each of the through holes 11 is formed as a conical hole which is tapering from the inner surface 101 of the protector cover 10 to the outer surface 102 of the protector cover 10. In other words, a diameter of each through hole 11 is gradually reducing from the inner surface 101 at the rear side of the protector cover 11 to the outer surface 102 at the front side of the protector cover 11, so as to allow each corresponding eye member 20 to be installed into the corresponding through hole 11 at a rear side of the protector cover 10. Each camera lens 302 of the camera assembly 301 of the mobile phone 300 is fitted into the corresponding through hole 11 under the corresponding eye member 20, so as to reduce a distance between the camera lens 302 and the corresponding eye member 20. Particularly, an end surface of the camera lens 302 may be attached to an inner surface of the corresponding eye member 20 that the filed of view of the camera lens 302 will not be affected.

Each eye member 20 comprises a mounting ring 21 and a light permeable film 22, the mounting ring 21 is provided around the light permeable film 22 for being mounted into the corresponding through hole 11 of the protector cover 10. The light permeable film 22, which may be a glass film or a transparent plastic film, is adapted for being aligned with the corresponding camera lens 302 of the camera assembly 301 of the mobile phone 300 to protect the corresponding camera lens 302 while allowing light to pass therethrough to reach the corresponding camera lens 302 for obtaining an image.

The mounting ring 21 of each eye member 20 can be attached to the protector cover 10 within the corresponding through hole 11 by an adhesive. The protector cover 10 also can be provided with an adhesive layer which is shaped and matched with the protector cover 10 at a bottom side of the protector cover 10 for being mounted to a rear surface of the mobile phone 300 around the camera assembly 301.

As shown in FIG. 3 of the drawings, when the camera lens protector assembly 100 is mounted on the camera assembly 301 of the mobile phone 300 by ah adhesive tape or a glue, the camera lens 302 is fitted within the mounting ring 21 of the corresponding eye member 20. In other words, each eye member 20 functions as a cap which is covered on the corresponding camera lens 302.

Figure 4:
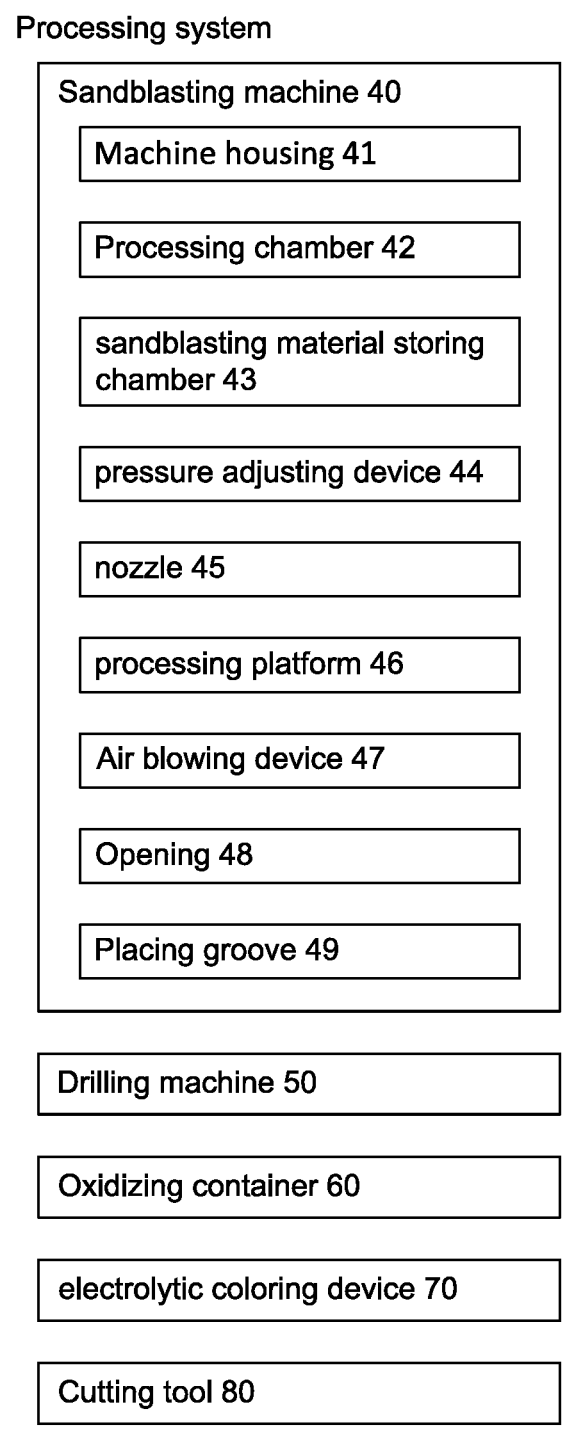
FIG. 4 is a diagram illustrating a processing system for treating an outer surface of a protector cover of the camera lens protector assembly according to the above preferred embodiment of the present invention.
Figure 5:
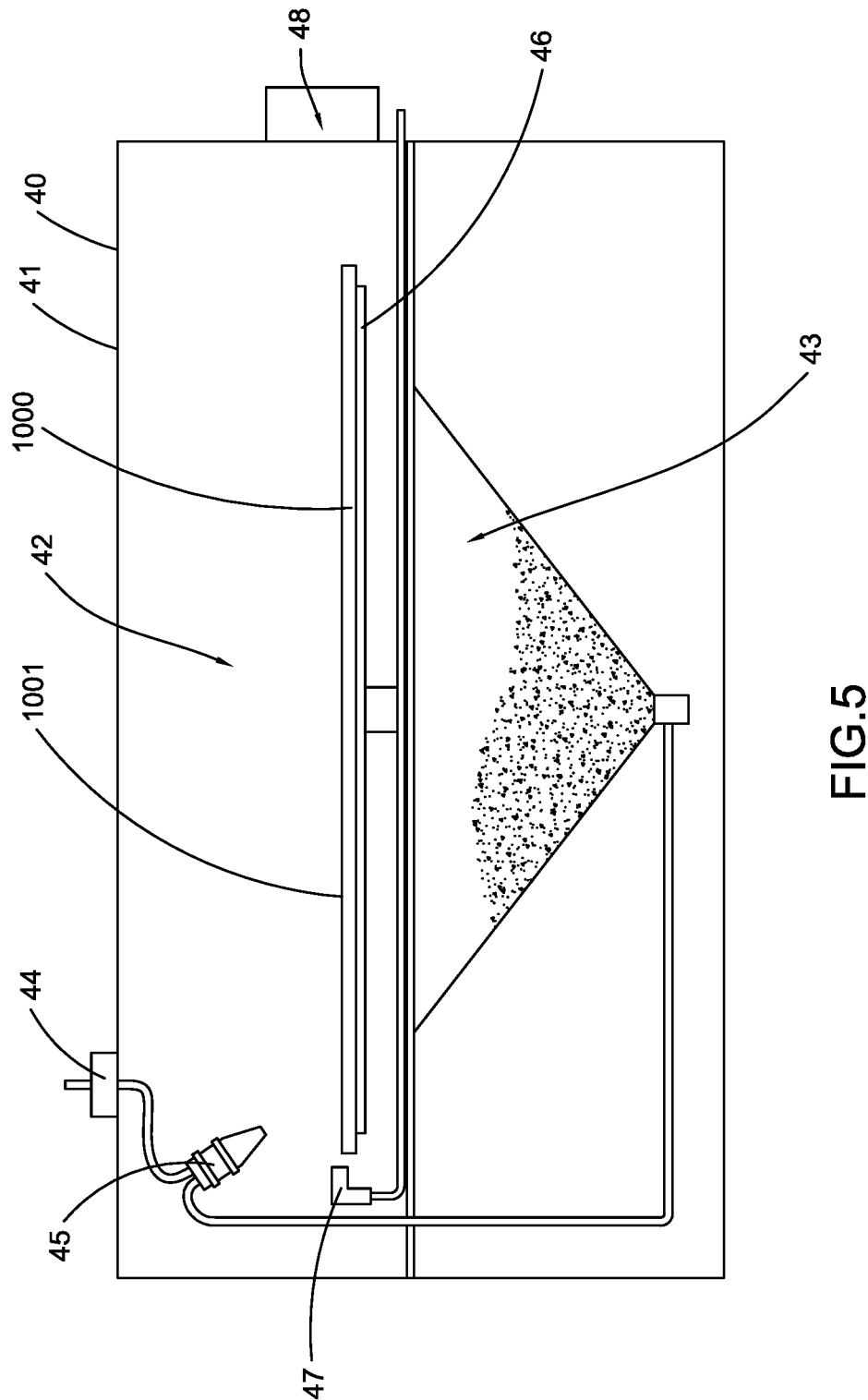
FIG. 5 is a schematic view illustrating a sandblasting machine of the processing system for treating the outer surface of the protector cover of the camera lens protector assembly according to the above preferred embodiment of the present invention.

Referring to FIG. 4 of the drawings, a processing system and a processing method for treating the outer surface 102 of the protector cover 10 is illustrated. The processing system comprises a sandblasting machine 40 for blasting a processing surface 1001 of an integral cover sheet 1000, a drilling machine 50 for forming the holes 11 and 12 in the integral cover sheet 1000, an oxidizing container 60 for oxidizing the processing surface of the integral cover sheet 1000, an electrolytic coloring device 70 for coloring the processing surface 1001 of the integral cover sheet 1000, and a cutting tool 80 for cutting the integral cover sheet 1000 into pieces to obtain a plurality of the protector covers 150.

The integral cover sheet 1000 can be a metal board or a metal alloy board, in this embodiment, the integral cover sheet 1000 is embodied as an aluminum board.

The sandblasting machine 40 comprises a machine housing 41 having a processing chamber 42 for processing the integral cover sheet 1000 and a sandblasting material storing chamber 43 for storing the sandblasting material, a pressure adjusting device 44 which is communicated to an air suction device, a nozzle 45 for discharging the sandblasting material, a processing platform 46 for placing the integral cover sheet 1000, and an air blowing device 47 for blowing air toward the processing platform 46 for blowing the sandblasting material on the processing platform 46 toward an opening of the processing chamber 42.

The processing platform 45 may be rotatably mounted in the processing chamber 42 so as to allow the integral cover sheet 1000 to be rotating during the sandblasting step, so that the sandblasting material can be evenly blasted on the processing surface 1001 of the integral cover sheet 1000 and allow the sandblasting material reaching to the integral cover sheet 1000 to leave the processing platform 45.

The pressure adjusting device 44 is communicated to the nozzle 45 which is communicated to the sandblasting material storing chamber 43, when the air suction device is in operation for producing a negative pressure, the pressuring adjusting device 44 is arranged to adjust the vacuum value of the negative pressure, so that the sandblasting material can be drawn to the nozzle 45 and discharged through the nozzle toward the processing surface 1001 of the integral cover sheet 1000.

The sandblasting material can be brown corundum, white corundum, glass sand, quartz sand, zirconium corundum, black corundum, green silicon carbide, resin sand, ceramic sand, resin sand, steel sand, steel shot, alumina sand, or silicon carbide. As a typical example, the sandblasting material in this embodiment can be steel sand.

According to this preferred embodiment, the nozzle 45 is inclinedly provided above the processing platform 46 for projecting the sandblasting material toward the integral cover sheet 1000 which is placed on the processing platform 46.

Figure 6:
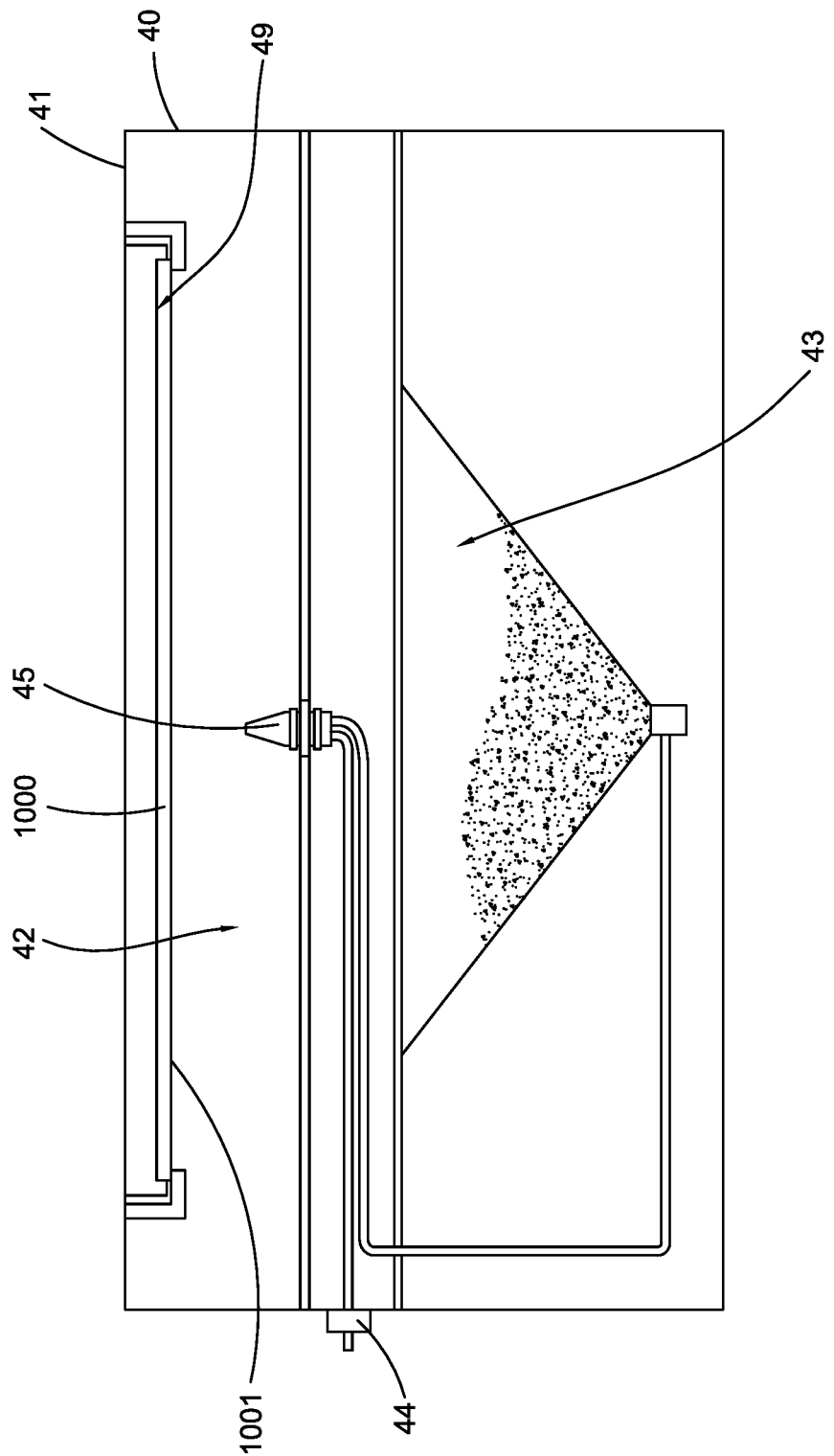
FIG. 6 is a schematic view illustrating a sandblasting machine of the processing system for treating the outer surface of the protector cover of the camera lens protector assembly according to an alternative mode of the above preferred embodiment of the present invention.
Figure 7:
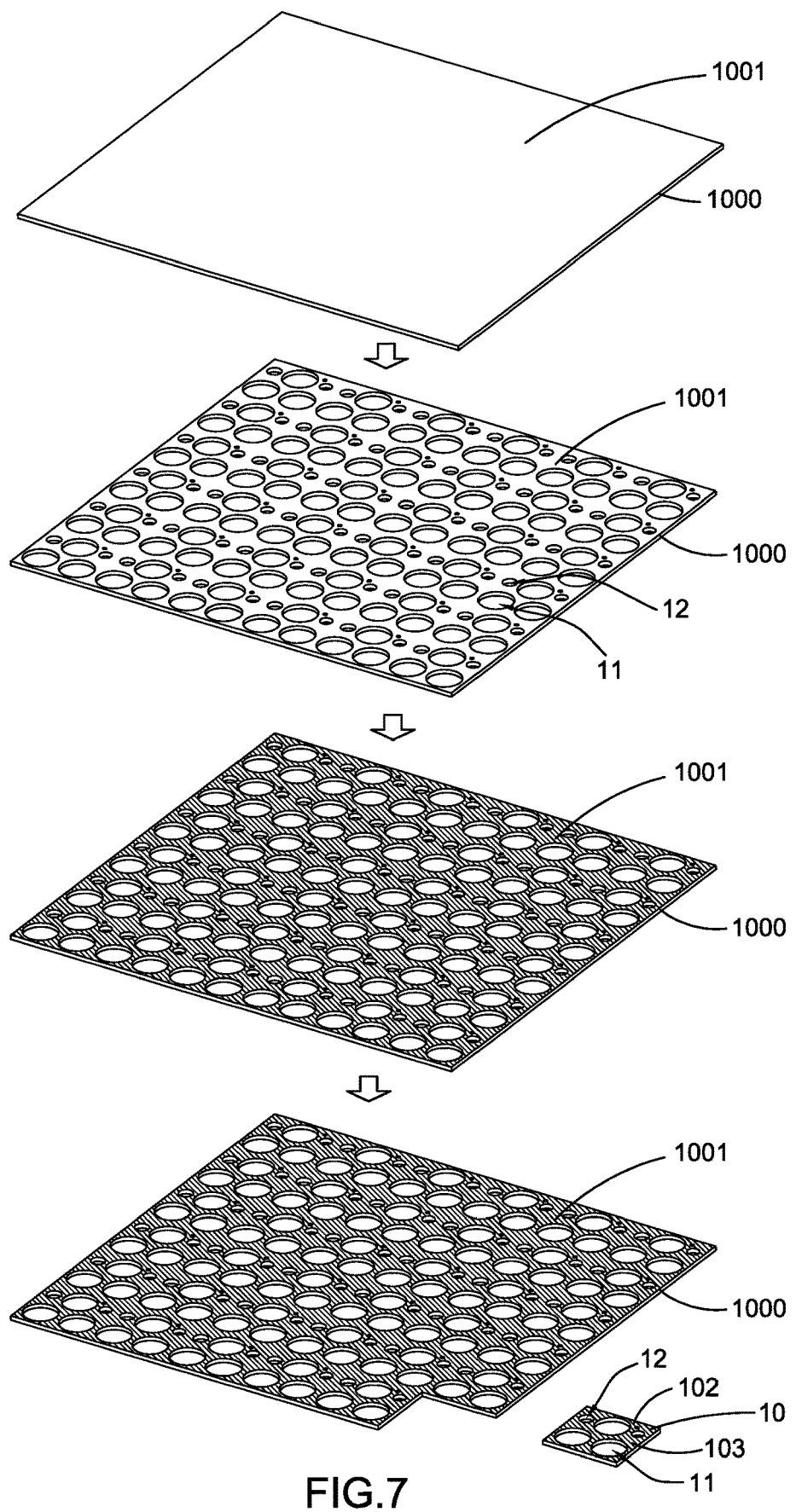
FIG. 7 is a perspective view illustrating a processing procedure for manufacturing the protector cover of the camera lens protector assembly according to the above preferred embodiment of the present invention.

As an alternative mode, as shown in FIG. 6 of the drawings, a placing groove 49 is formed in the processing chamber 42 for placing the integral cover sheet 1000. For example, the integral cover sheet 1000 is inserted into the placing groove 47 from an opening side of the placing groove 47. The nozzle 45 is provided under the placing groove 47, and thus when the integral cover sheet 1000 is placed in the placing groove 47, the nozzle 45 is provided under the integral cover sheet 1000 and the sandblasting material is driven to upwardly project toward the integral cover sheet 1000, and after the sandblasting material reach to the integral cover sheet 1000, the sandblasting material will not remain on the processing surface 1001 of the integral cover sheet 1000, but will automatically drop on the bottom surface of the processing chamber 42.

In this alternative mode, the nozzle 45 may be movably provided in the processing chamber 42 for adjusting the projecting directions of the sandblasting material, so as to evenly direct the sandblasting material toward the integral cover sheet 1000. As an example, the nozzle 45 may be slidable along a guiding rail in the processing chamber 42.

After the integral cover sheet 1000 is taken out from the sandblasting machine 40, the integral cover sheet 1000 is fed into the drilling machine 50 to form the through holes 11 and the penetrating holes 12.

Then, the integral cover sheet 1000 with the through holes 11 and the penetrating holes 12 is cleaned and placed into the oxidizing container 60 which is filled with sulfuric acid solution, the aluminum integral cover sheet 1000 is functioning as the anode, and an industrial pure aluminum plate is employed as the cathode, in the solution the sulfuric acid with a DC voltage for about half an hour to undergoing the oxidizing process for treating the processing surface 1001 of the integral cover sheet 1000, so as obtain an anodized film with a thickness of more than 10 microns.

Then the integral over sheet 1000 with the anodized film can be cut by the cutting tool 80 into pieces to provide the multiple protector covers 10.

Alternatively, the integral over sheet 1000 with the anodized film may be feed into the electrolytic coloring device 70 for coloring the processing surface 1001 of the integral cover sheet 1000.

More specifically, as an example, the electrolytic coloring device 70 can be filled with an aqueous solution containing a metal salt, wherein the aqueous solution of the metal salt comprises nickel salt, manganese salt, ammonium salt, hydroxy polycarboxylate, boric acid and water, and the nickel salt is 10~90 g/L, 1-30 g/L manganese salt, 10-80 g/L ammonium salt, 1-50 g/L hydroxy polycarboxylate, 10-50 g/L boric acid, The balance is water, the pH value of the solution is 3.0-7.0, and the temperature is 20-65° C. With the accumulation of time, the integral over sheet 1000 with the anodized film can obtain the tinted film of bronze color series from amber to true black.

After being treated in the electrolytic coloring device 70, the integral cover sheet 10 can be then cut into the small pieces of the protector covers 10 for being mounted with the eye members 20 for providing the camera lens protector assembly 100.

Accordingly, the method of this embodiment for manufacturing the protector cover 12 comprises a sandblasting step, a hole forming step, an oxidizing step, a selective electrolytic coloring step, and a cutting step, as shown in FIG. 11 of the drawings.

In the sandblasting method, the processing surface 10001 of the integral cover sheet 1000 is treated by the sandblasting material which can be steel sand which is punching on the processing surface 10001 of the integral cover sheet 1000.

In the hole forming step, the integral cover sheet 1000 is drilled to form the through holes 11 and the penetrating holes 12. Preferably, each through hole 11 is drilled to form as a conical hole which is tapering from a rear surface of the integral cover sheet 1000 to the processing surface of the integral cover sheet 1000, so that the diameter of each through hole 11 is gradually reducing from the rear surface of the integral cover sheet 1000 to the processing surface 1001 at the front side of the integral cover sheet 1000.

It is worth mentioning that the hole forming step is carried out after the sandblasting method. If the hole forming step is carried out before the sandblasting method, the sandblasting material will pass through the holes in the integral cover sheet 1000, the sandblasting material may alter the configuration and shape of the holes, and the sandblasting material may reach to positions in the processing chamber 42 which is not convenient for removal of the sandblasting material.

In the oxidizing step, the processing surface 1001 of the integral cover sheet 1000 which can be embodied as an aluminium board is immersed into the sulfuric acid solution to accomplish an oxidizing reaction to form anodized film. In other words, the the processing surface 1001 of the integral cover sheet 1000 is anodized to form the anodized film.

Alternatively, the integral cover sheet 1000 with the anodized film may further undergo the electrolytic coloring step in which the integral cover sheet 1000 with the anodized film is treated in the aqueous solution containing the metal salt so as to color the processing surface 1001 of the integral cover sheet 1000.

In the cutting step, the integral cover sheet 1000 is finally cut into pieces to prepare the protector covers 10 each having the surface profile 103 on the outer surface 102 which is a blasted surface with the anodized film or the coloring layer formed in the electrolytic coloring step.

After preparing the protector cover 10, the eye members 20 are installed at a rear side of the protector cover 10 into the through holes 11 by an adhesive so as to manufacturing the camera lens protector assembly 100 of the mobile phone 300.

Figure 8:
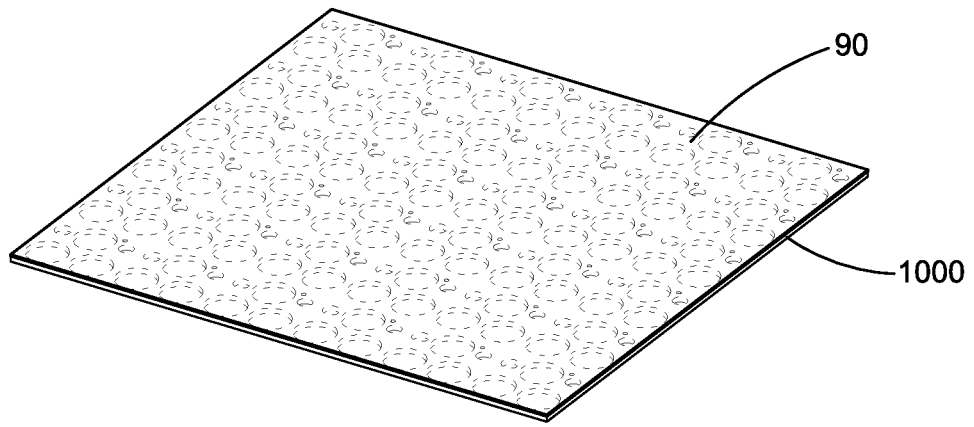
FIG. 8 is a perspective view illustrating an integral cover sheet for a camera lens protector assembly of a mobile phone according to an alternative mode the above preferred embodiment of the present invention.
Figure 9:
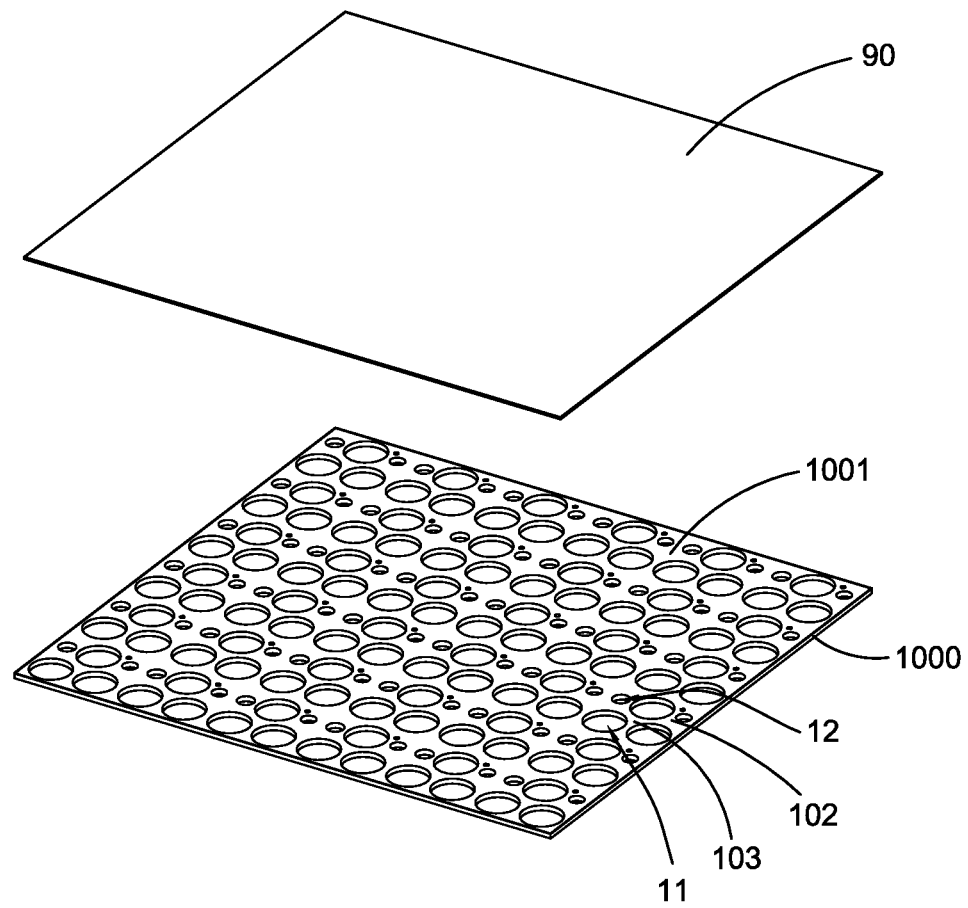
FIG. 9 is an exploded view illustrating integral cover sheet for the camera lens protector assembly according to the alternative mode the above preferred embodiment of the present invention.

Referring to FIG. 8 to FIG. 10 of the drawings, a camera lens protector assembly 100 of a mobile phone 200 according to an alternative mode of the above preferred embodiment of the present invention is illustrated, the camera lens protector assembly 100 comprises a protector cover 10 having a plurality of through holes 11 for aligning with a plurality of camera lenses 302 of a camera assembly 301 of the mobile phone 30, and a protector film 90 adhered on the outer surface 102 of the protector cover 10 to protect the camera lenses 302 while simultaneously allow the light to pass through the protector film 90 to reach the camera lenses 302. The protector film 90 can be embodied as a glass film or a plastic film.

As shown in FIG. 8 and FIG. 9, an integral cover sheet 1000 with an integral large piece of protector film 90 is formed, the integral large piece of protector film 90 is adhered on the outer processing surface 1001 of the integral cover sheet 1000. As shown in FIG. 10, the integral cover sheet 1000 is cut into pieces to provide the plurality of protector covers 10.

According to this preferred embodiment, the eye members 20 in the above preferred embodiment can be omitted. The protector cover 10 is prepared by the sandblasting step, the hole forming step, the oxidizing step, the optional electrolytic coloring step, and the cutting step, so that the outer surface 102 of the protector cover 10 is formed with the surface profile 103 which is a blasted surface with the anodized film or the coloring layer formed in the electrolytic coloring step, so that the aesthetic appearance of the protector cover 10 is enhanced, so as to well match with the rear surface of the mobile phone 300 to provide a decorating performance in addition to provide the protecting function.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A camera lens protector assembly of mobile phone comprising one or more camera lenses, comprising:
   one or more eye members; and
   a protector cover, wherein said protector cover is manufactured by a method comprising the following steps:
   (a) sandblasting a processing surface of an integral cover sheet by a sandblasting material;
   (b) forming a plurality of through holes in said integral cover sheet with a blasted processing surface;
   (c) oxidizing said processing surface of said integral cover sheet with said plurality of through holes; and
   (d) cutting said integral cover sheet to provide a plurality of said protector covers, wherein said protector cover has one or more said through holes, wherein said one or more eye members are respectively mounted into said one or more through holes to protect the one or more camera lenses of the mobile phone, wherein said protector cover comprises an outer surface which is formed from said processing surface of said integral cover sheet.

2. The camera lens protector assembly according to claim 1, wherein after the step (c), the method further comprises a step (e): electrolytic coloring said processing surface of said integral cover sheet ins an aqueous solution containing a metal salt.

3. The camera lens protector assembly according to claim 1, wherein each of said one or more eye members comprises a mounting ring and a light permeable film, wherein said mounting ring is provided around said light permeable film.

4. The camera lens protector assembly according to claim 3, wherein said light permeable film is one of glass film and plastic film.

5. The camera lens protector assembly according to claim 3, wherein the one or more camera lenses are respectively adapted for being fitted within said mounting rings of said corresponding eye members.

6. The camera lens protector assembly according to claim 1, wherein said protector cover is made of aluminium.

7. The camera lens protector assembly according to claim 1, where said sandblasting material is selected from the group consisting of brown corundum, white corundum, glass sand, quartz sand, zirconium corundum, black corundum, green silicon carbide, resin sand, ceramic sand, resin sand, steel sand, steel shot, alumina sand, and silicon carbide.

8. The camera lens protector assembly according to claim 1, where said protector cover has one or more penetrating holes which is adapted for aligning with at least one of a flash and a 3D scanner of the mobile phone.

9. The camera lens protector assembly according to claim 1, wherein each of said one or more eye members is assembled from a rear side of said protector cover.

10. The camera lens protector assembly according to claim 1, wherein each of said one or more through holes is a conical hole conical hole which is tapering from an inner surface of said protector cover to said outer surface of said protector cover.

11. The protector cover according to claim 1, wherein said protector cover is made of aluminium.

12. The protector cover according to claim 1, where said sandblasting material is selected from the group consisting of brown corundum, white corundum, glass sand, quartz sand, zirconium corundum, black corundum, green silicon carbide, resin sand, ceramic sand, resin sand, steel sand, steel shot, alumina sand, and silicon carbide.

13. The protector cover according to claim 1, where said protector cover has one or more penetrating holes which is adapted for aligning with at least one of a flash and a 3D scanner of the mobile phone.

14. The protector cover according to claim 1, wherein each of said one or more eye members is assembled from a rear side of said protector cover.

15. The protector cover according to claim 1, wherein each of said one or more through holes is a conical hole conical hole which is tapering from an inner surface of said protector cover to said outer surface of said protector cover.

16. The protector cover according to claim 1, further comprising an integral protector film adhered on said outer surface of said protector cover.

17. A protector cover of a camera lens protector assembly of mobile phone comprising one or more camera lenses, wherein said protector cover is manufactured by a method comprising the following steps:
 (a) sandblasting a processing surface of an integral cover sheet by a sandblasting material;
 (b) forming a plurality of through holes in said integral cover sheet with a blasted processing surface;
 (c) oxidizing said processing surface of said integral cover sheet with said plurality of through holes; and
 (d) cutting said integral cover sheet to provide a plurality of said protector covers, wherein said protector cover has one or more said through holes which are adapted for aligning with the one or more camera lenses, wherein said protector cover comprises an outer surface which is formed from said processing surface of said integral cover sheet.

18. The protector cover according to claim 17, wherein after the step (c), the method further comprises a step (e): electrolytic coloring said processing surface of said integral cover sheet ins an aqueous solution containing a metal salt.

19. The protector cover according to claim 17, wherein each of said one or more eye members comprises a mounting ring and a light permeable film, wherein said mounting ring is provided around said light permeable film.

20. The protector cover according to claim 19, wherein said light permeable film is one of glass film and plastic film, wherein the one or more camera lenses are respectively adapted for being fitted within said mounting rings of said corresponding eye members.

* * * * *